(12) United States Patent
Okada (10) Patent No.: US 7,724,694 B2
(45) Date of Patent: May 25, 2010

(54) DOPPLER FREQUENCY CALCULATING APPARATUS AND METHOD AND OFDM DEMODULATING APPARATUS

(75) Inventor: Takahiro Okada, Saitama (JP)

(73) Assignee: Sony Corporation (JP)

( * ) Notice: Subject to any disclaimer, the term of this patent is extended or adjusted under 35 U.S.C. 154(b) by 978 days.

(21) Appl. No.: 11/486,580

(22) Filed: Jul. 14, 2006

(65) Prior Publication Data

US 2007/0030798 A1      Feb. 8, 2007

(30) Foreign Application Priority Data

Jul. 15, 2005    (JP)    ............................ P2005-207417

(51) Int. Cl.
*H04B 7/00* (2006.01)
(52) U.S. Cl. ..................................... 370/310
(58) Field of Classification Search ......... 370/203–210, 370/310, 312, 342–345, 464
See application file for complete search history.

(56) References Cited

U.S. PATENT DOCUMENTS

| | | | | |
|---|---|---|---|---|
| 6,907,026 | B2 * | 6/2005 | Akiyama | 370/344 |
| 7,099,270 | B2 * | 8/2006 | Yamaguchi | 370/208 |
| 7,248,559 | B2 * | 7/2007 | Ma et al. | 370/208 |
| 7,292,651 | B2 * | 11/2007 | Li | 375/316 |
| 7,424,072 | B2 * | 9/2008 | Hayashi et al. | 375/346 |
| 7,433,433 | B2 * | 10/2008 | Wilhelmsson et al. | 375/350 |
| 7,436,757 | B1 * | 10/2008 | Wilson et al. | 370/203 |

FOREIGN PATENT DOCUMENTS

| | | | |
|---|---|---|---|
| JP | 7-231285 A | 8/1995 |
| JP | 8-032552 A | 2/1996 |
| JP | 10-065610 A | 3/1998 |
| JP | 10-075226 A | 3/1998 |
| JP | 11-068630 A | 3/1999 |
| JP | 2003-134010 A | 5/2003 |
| JP | 2005-191662 A | 7/2005 |
| JP | 2005-286636 A | 10/2005 |
| JP | 2006-157663 A | 6/2006 |
| JP | 2006-229323 A | 8/2006 |

OTHER PUBLICATIONS

"Receiver for Digital Terrestrial Sound Broadcast Overview of the ARIB Standard (ARIB STD-B30)," Association of Radio Industries and Businesses, issued Dec. 8, 2000.
DVB-T, ETSI EN 300 744 v1.5.1 (Nov. 2004), 64 pages.

* cited by examiner

*Primary Examiner*—Dmitry H Levitan
(74) *Attorney, Agent, or Firm*—Lerner, David, Littenberg, Krumholz & Mentlik, LLP (57) ABSTRACT

A Doppler frequency calculating apparatus that calculates a Doppler frequency, which is the magnitude of a time-dependent fluctuation of a characteristic of the transmission path through which an orthogonal frequency-division multiplexing (OFDM) signal is transmitted, includes a received signal point memory operable to store a received signal point of a sub-carrier having a reference carrier signal of the OFDM signal, a modulated component eliminating section operable to eliminate a modulated component from the received signal point stored in the received signal point memory, and a Doppler frequency calculating section operable to calculate a Doppler frequency by performing frequency analysis on the received signal point of each sub-carrier from which the modulated component has been eliminated by the modulated component eliminating section.

7 Claims, 11 Drawing Sheets

DOPPLER FREQUENCY CALCULATING APPARATUS AND METHOD AND OFDM DEMODULATING APPARATUS

CROSS-REFERENCE TO RELATED APPLICATIONS

The present application claims priority from Japanese Patent Application No. JP2005-207417 filed on Jul. 15, 2005, the disclosure of which is hereby incorporated by reference herein.

BACKGROUND OF THE INVENTION

1. Field of the Invention

The present invention relates to a Doppler frequency calculating apparatus and method that calculates a Doppler frequency, which is the magnitude of a time-dependent fluctuation of the characteristic of a transmission path for receiving an orthogonal frequency division multiplexing (OFDM) signal in motion, for example, and an OFDM demodulating apparatus that performs equalizing processing by using the calculated Doppler frequency.

2. Description of the Related Art

Digital signals may be transmitted by a modulating method called Orthogonal Frequency Division Multiplexing method (called OFDM method hereinafter). In OFDM method, data is assigned and is digitally modulated to the amplitude and phase of each of many orthogonal sub-carriers within a transmission band by PSK (Phase Shift Keying) or a QAM (Quadrature Amplitude Modulation).

In OFDM method, the total transmission speed is the same as that of a modulation method in the past though the modulation speed decreases since the transmission band is divided by the multiple sub-carriers and the band for each sub-carrier is narrow. Furthermore, in OFDM method, the symbol speed decreases since many sub-carriers are transmitted in parallel, and the relative time length of multipath can be shorter than the symbol time length, resulting in the resistance to multipath interference.

Still further, in OFDM method, since data is assigned to multiple sub-carriers, a transmitting/receiving circuit may include an IFFT (Inverse Fast Fourier Transform) calculating circuit that performs inverse Fourier transform upon modulation and an FFT (Fast Fourier Transform) calculating circuit that performs Fourier transform upon demodulation.

For these characteristics, OFDM method may often be applied in terrestrial digital broadcasting, which is susceptible to multipath interference. For example, the standards for the terrestrial digital broadcasting adopting such OFDM method may include DVB-T (Digital Video Broadcasting-Terrestrial) and ISDB-T (Integrated Services Digital Broadcasting-Terrestrial).

Figure 10:
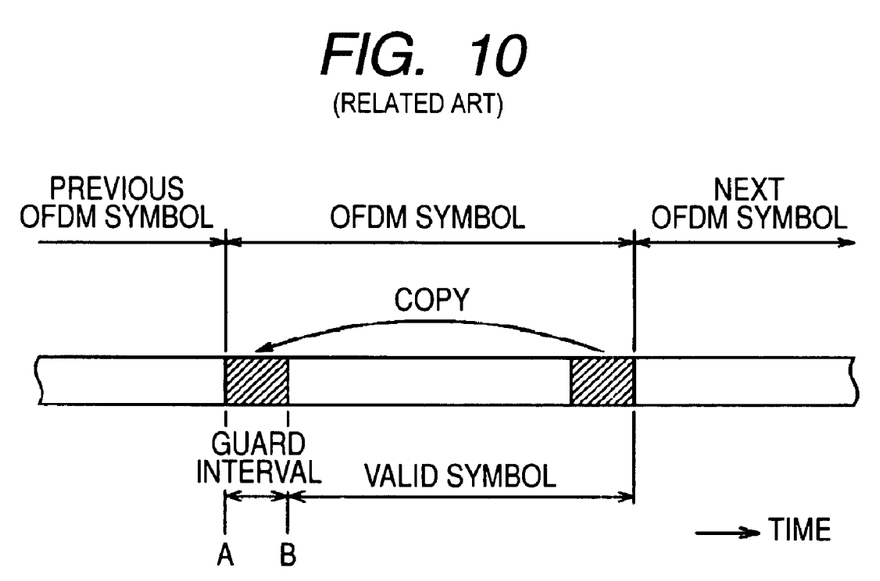
FIG. 10 is a diagram for describing a transmission symbol of an OFDM signal.

The transmission symbol in OFDM method (called OFDM symbol hereinafter) includes, as shown in FIG. 10, a valid symbol and a guard interval. The valid symbol is a signal period when IFFT is performed upon transmission. The guard interval is a copy of the waveform of a part of the second half of the valid symbol. The guard inertial is provided in the first half of the OFDM symbol. The existence of the guard interval in OFDM method allows the inter-symbol interference due to the multipath, which improves the multipath resistance.

For example, in Mode 3 of ISDB-TSB standard (which is a broadcasting standard adopted in Japan for terrestrial digital voice broadcasting. See "Chijo Dejitaru Onsei Hosoyo Jushin Souchi Hyoujun Kikaku (Nozomashii Shiyou) (Standard Specification (Desirable Standard) of Receiving Apparatus for Terrestrial Digital Voice Broadcasting) ARIB STD-B30", Association of Radio Industries and Business, a valid symbol contains 512 sub-carriers, and the sub-carrier interval is 125/126≈0.992 kHz. In Mode 3 of the ISDB-TSB standard, 433 sub-carriers of 512 sub-carriers within a valid symbol are modulated by transmission data. In Mode 3 of ISDB-TSB standard, the time length of a guard interval is one of ¼, ⅛, 1/16 and 1/32 of the time length of the valid symbol.

OFDM method defines that one OFDM frame, which is a transmission unit, includes a collection of multiple OFDM symbols as described above. For example, in ISDB-TSB standard, one OFDM frame includes 204 OFDM symbols. In OFDM method, the position to which a pilot signal is to be inserted may be defined in the OFDM frame units, for example.

In OFDM method adopting QAM modulation as a modulation method for each sub-carrier, the characteristics of the amplitude and phase may differ among sub-carriers when the signals carried and modulated in the sub-carriers are distorted by the influence of the multipath upon transmission. Accordingly, received signals may need to be wave-equalized in a receiver side such that the amplitudes and phases of the sub-carriers can be equal. In OFDM method, a sender side scatters pilot signals with a predetermined amplitude and a predetermined phase within a transmission symbol in a transmitted signal while the receiver side monitors the amplitude and phase of the pilot signals, calculates the frequency characteristic of the transmission path, and equalizes the received signal by using the calculated characteristic of the transmission path. In OFDM method, a scattered pilot (SP) signal and/or a continual pilot (CP) signal, which will be described later, may be used as a pilot signal, which is to be used for calculating the characteristic of a transmission path.

Figure 11:
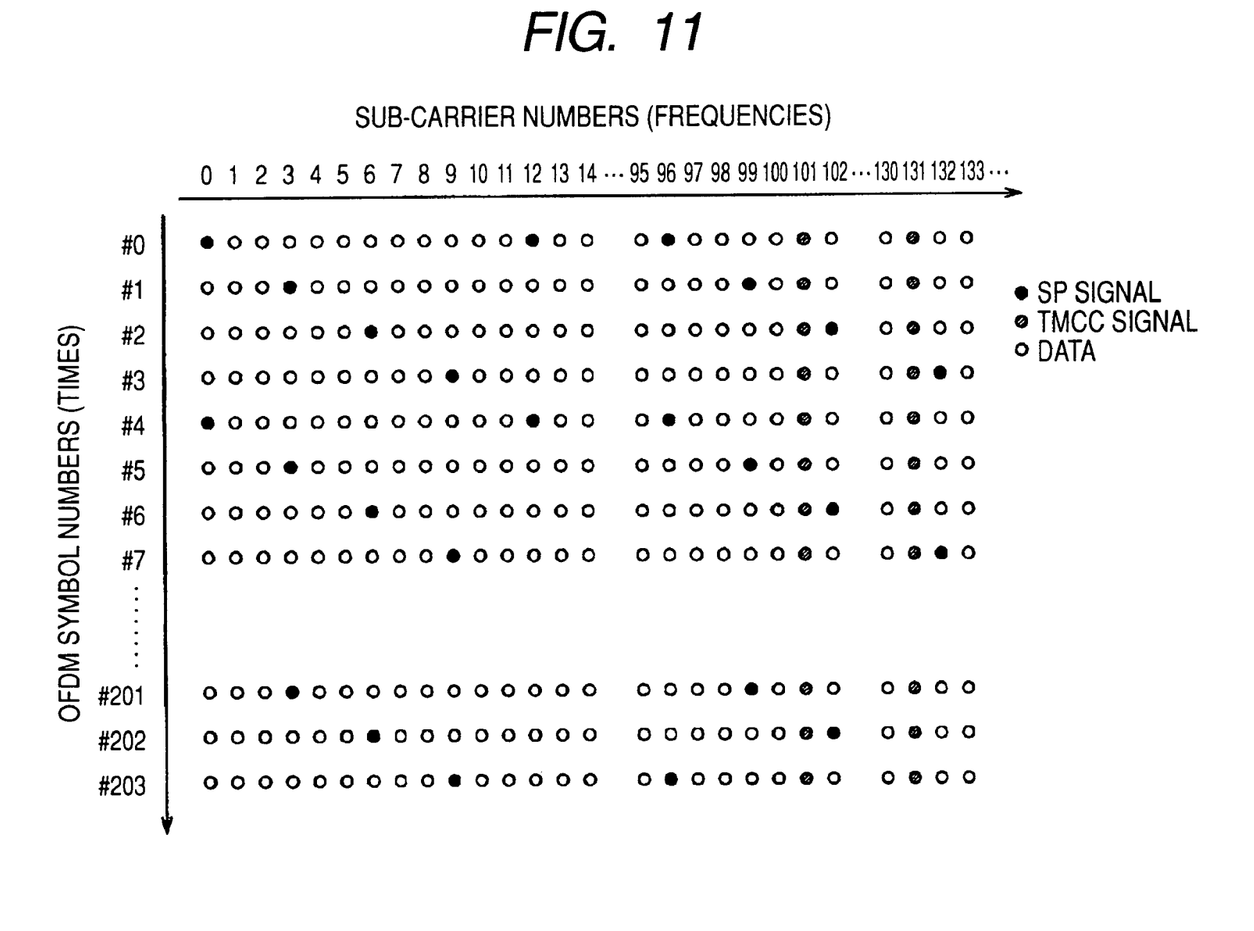
FIG. 11 is a diagram for describing the position where an SP signal is inserted in an OFDM signal.

FIG. 11 shows an arrangement pattern of SP signals within an OFDM symbol, which is adopted in ISDB-T standard.

In ISDB-T standard, one BPSK-modulated SP signal is inserted every 12 sub-carriers in the sub-carrier direction (frequency direction). Furthermore, in DVB-T standard or ISDB-T standard, the position where the SP signal is inserted is shifted in the frequency direction by three sub-carriers in each OFDM symbol. As a result, an SP signal is inserted every four OFDM symbols in one sub-carrier in the OFDM symbol direction (time direction)

In this way, in ISDB-T standard, an OFDM symbol is inserted with SP signals spatially scattered, whereby the redundancy of the SP signals is lowered for original information.

By the way, when the transmission path characteristic is calculated by using the SP signal, the characteristic can be specified for the sub-carrier to which SP signals are inserted. However, the characteristics may not be directly calculated for the other sub-carriers, that is, the other sub-carriers including original information. Therefore, the receiver side estimates the transmission path characteristics of the other sub-carriers including original information by filtering SP signals through a two-dimensional interpolation filter.

The processing of estimating a transmission path characteristic through a two-dimensional interpolation filter is generally performed as follows.

That is, in order to perform the processing of estimating a transmission path characteristic, the information component is eliminated from a received OFDM signal, and SP signals inserted at the positions shown in FIG. 11 are only extracted.

Next, the modulated component of each of the extracted SP signals is eliminated by using a reference SP signal. The SP signal from which the modulated component is eliminated exhibits the transmission path characteristic of the sub-carrier to which the SP signal is inserted.

Figure 12:
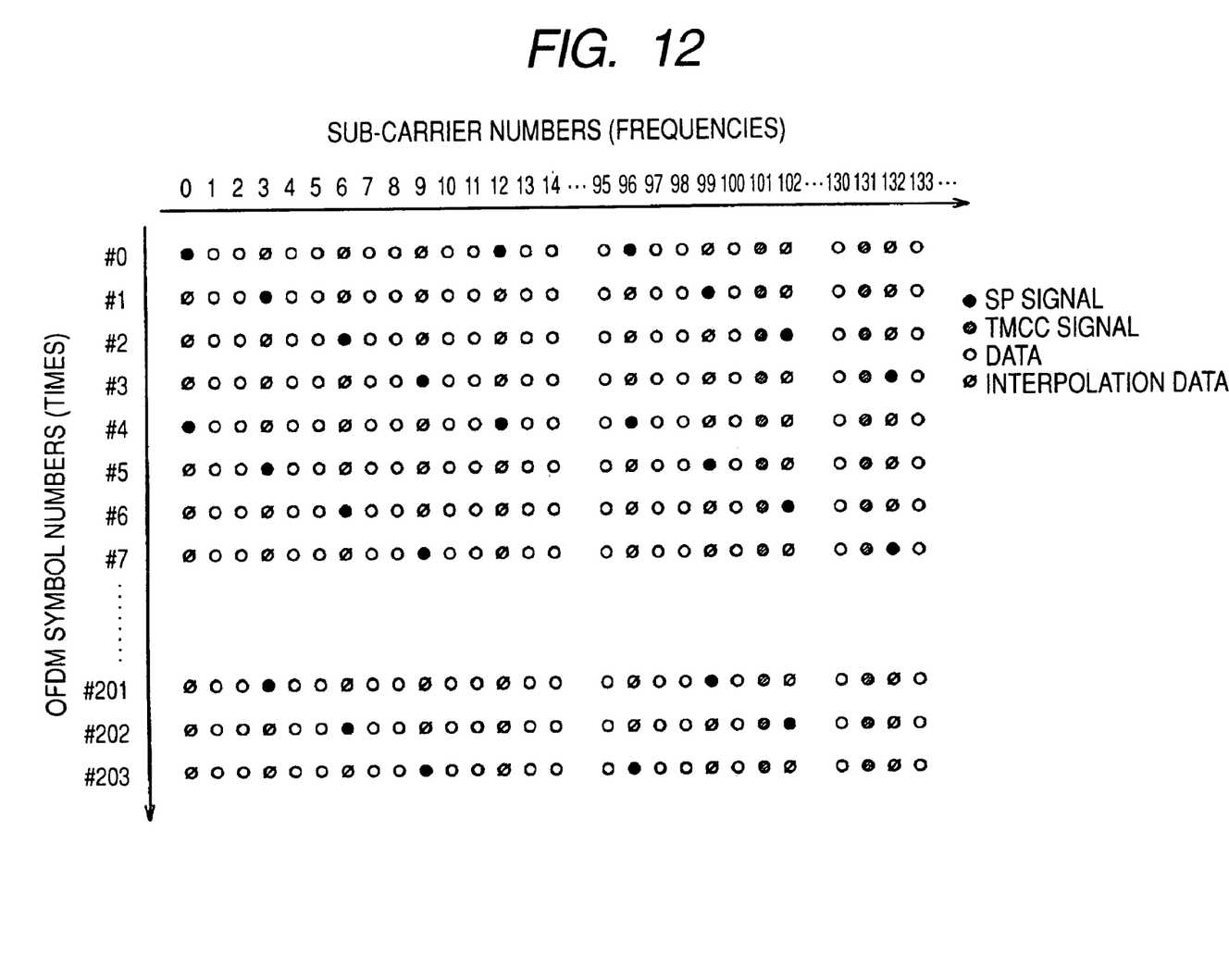
FIG. 12 is a diagram for describing a sub-carrier for which the transmission path characteristic is estimated with a time-direction interpolation filter.

Next, the SP signal from which the modulated component is removed is input to an interpolation filter in the time direction and undergoes time direction interpolation processing therein, whereby the transmission path characteristic of the sub-carrier including the SP signal is estimated for every OFDM symbol. As a result, as shown in FIG. 12, the transmission path characteristic of every three sub-carriers can be estimated in the frequency direction for all OFDM symbols.

Figure 13:
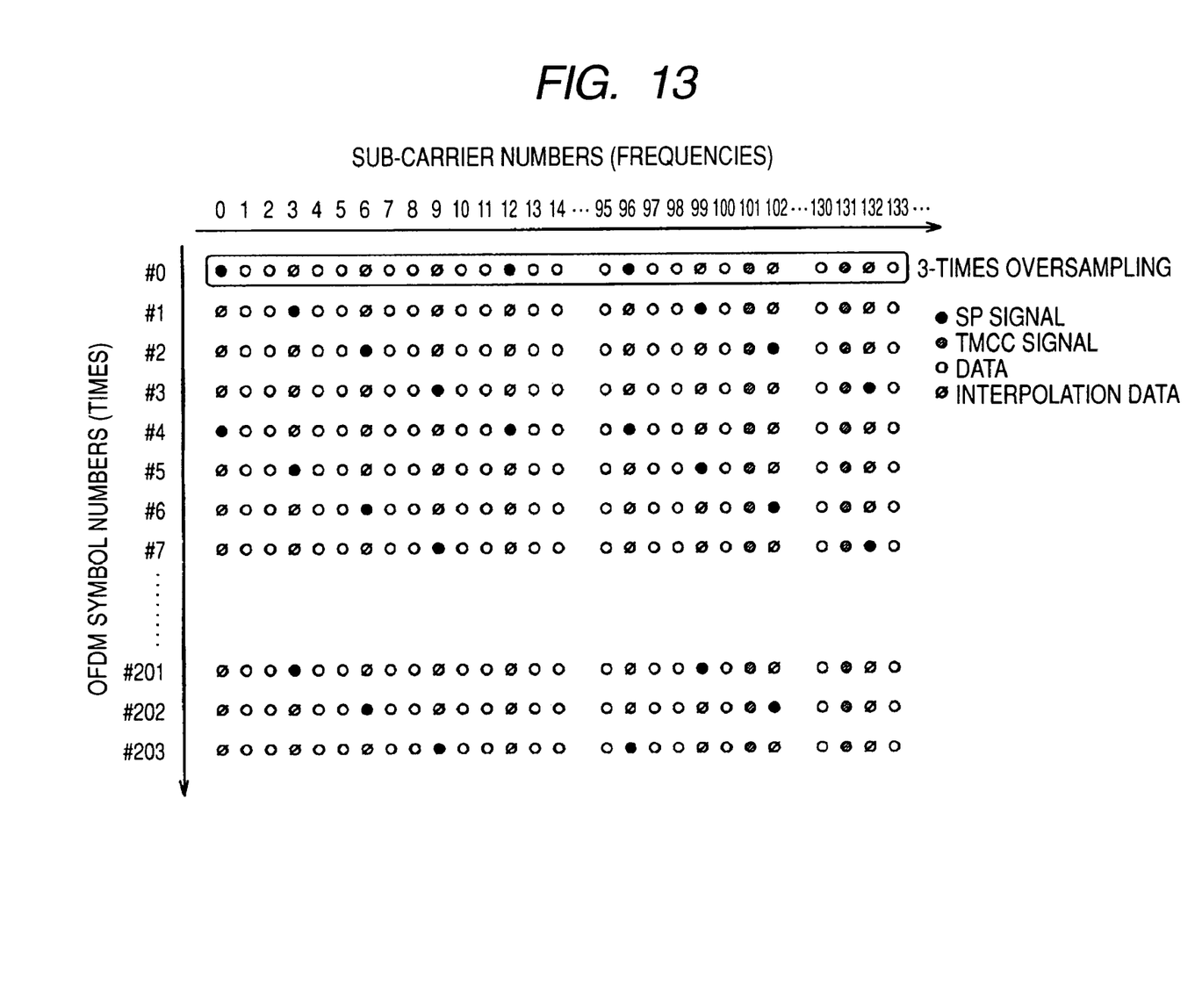
FIG. 13 is a diagram for describing interpolation-filter processing in a frequency direction in order to estimate a transmission path characteristic.

Next, as shown in FIG. 13, the SP signal interpolated in the time direction is input to an interpolation filter in the frequency direction and undergoes frequency direction interpolation processing through three-times oversampling, whereby the transmission path characteristic of all sub-carriers within the OFDM symbol is estimated. As a result, the transmission path characteristic of all sub-carriers of the received OFDM signal can be estimated.

Since the transmission path characteristic fluctuates depending on time when an OFDM signal is received in motion, the estimation of the transmission path characteristic with an SP signal is difficult. For example, time-direction interpolation processing may be performed on an SP signal when the Doppler frequency, which is the magnitude of the time-dependent fluctuation of the transmission path characteristic, is large. In this case, since the Nyquist condition is not satisfied, a wrong estimation result is obtained for the transmission path characteristic. Then, it is proposed in the past that a Doppler frequency is calculated based on speed information from a speedometer, and the transmission path characteristic is corrected in accordance with the magnitude of the calculated Doppler frequency (see JP-A-10-75226).

However, with the Doppler frequency calculating method by using a speedometer in the past, a Doppler frequency may not be calculated if speed information is not available from the speedometer.

Accordingly, it is desirable to propose a Doppler frequency calculating apparatus and method, which allows the calculation of a Doppler frequency without a speedometer and an OFDM demodulating apparatus that performs equalizing processing by using the calculated Doppler frequency.

SUMMARY OF THE INVENTION

According to an embodiment of the present invention, there is provided a Doppler frequency calculating apparatus that calculates a Doppler frequency, which is the magnitude of a time-dependent fluctuation of a characteristic of the transmission path through which an orthogonal frequency-division multiplexing (OFDM) signal is transmitted, the apparatus including a received signal point memory operable to store a received signal point of a sub-carrier having a reference carrier signal of the OFDM signal; a modulated component eliminating section operable to eliminate a modulated component from the received signal point stored in the received signal point memory; and a Doppler frequency calculating section operable to calculate a Doppler frequency by performing frequency analysis on the received signal point of each sub-carrier from which the modulated component has been eliminated by the modulated component eliminating section.

According to another embodiment of the invention, there is provided a Doppler frequency calculating method that calculates a Doppler frequency, which is the magnitude of a time-dependent fluctuation of a characteristic of the transmission path through which an orthogonal frequency-division multiplexing (OFDM) signal is transmitted, the method including storing a received signal point of a sub-carrier having a reference carrier signal of the OFDM signal; eliminating a modulated component from the received and stored signal point; and calculating a Doppler frequency by performing frequency analysis on the received signal point of each sub-carrier from which the modulated component has been eliminated.

According to another embodiment of the invention, there is provided an OFDM demodulating apparatus that demodulates an orthogonal frequency-division multiplexing (OFDM) signal having a pilot signal discretely in a predetermined sub-carrier within a transmission symbol where the transmission symbol results from the division and orthogonal modulation of information for multiple sub-carriers within a predetermined band and is handled as a transmission unit, and the pilot signal has a specific amount of power and a specific phase, the apparatus including a Fourier converting section operable to perform a Fourier conversion on the OFDM signal in transmission symbols; a pilot signal extracting section operable to extract the pilot signal in each transmission symbol from a signal converted by the Fourier-converting section; a wave-equalizing section operable to estimate a characteristic of a transmission path of all sub-carriers within a transmission symbol by interpolating the pilot signal extracted by the pilot signal extracting section using a time direction interpolation filter and a frequency direction interpolation filter and wave-equalizing a signal having undergone Fourier-conversion by the Fourier converting section based on the estimated characteristic of the transmission path of the sub-carriers; and a Doppler frequency calculating section operable to store, in a received signal point memory section, the received signal point of the sub-carrier having the pilot signal of the OFDM signal, to eliminate a modulated component from the received signal point stored in the received signal point memory section, and to calculate a Doppler frequency, which is the magnitude of a time-dependent fluctuation of a characteristic of the transmission path, by performing frequency analysis on the received signal point of each sub-carrier from which the modulated component has been eliminated, wherein the wave-equalizing section calculates the characteristics of the transmission paths of all of the sub-carriers within the transmission symbol by performing interpolation using the frequency direction interpolation filter only when the Doppler frequency calculated by the Doppler frequency calculating section is larger than a threshold frequency.

In the Doppler frequency calculating apparatus and method according to embodiments of the invention, the modulated component is eliminated from a received signal point of a sub-carrier containing a reference carrier signal such as transmission control information, an AC signal, a CP signal and an SP signal, and frequency analysis is performed on the received signal point from which the modulated component is eliminated for each sub-carrier. Thus, the Doppler frequency can be calculated without a speedometer.

Furthermore, with the OFDM demodulating apparatus according to an embodiment of the invention, the transmission path characteristic of all sub-carriers within a transmission symbol can be estimated by performing interpolation thereon using a frequency-direction interpolation filter only without a time-direction interpolation filter when the calculated Doppler frequency is larger than a threshold frequency. Thus, the transmission path characteristic can be properly estimated even when the Doppler frequency is large and the Nyquist condition is not satisfied.

DETAILED DESCRIPTION

An OFDM receiving apparatus under ISDB-T standard according to embodiments of the invention will be described below.

Figure 1:
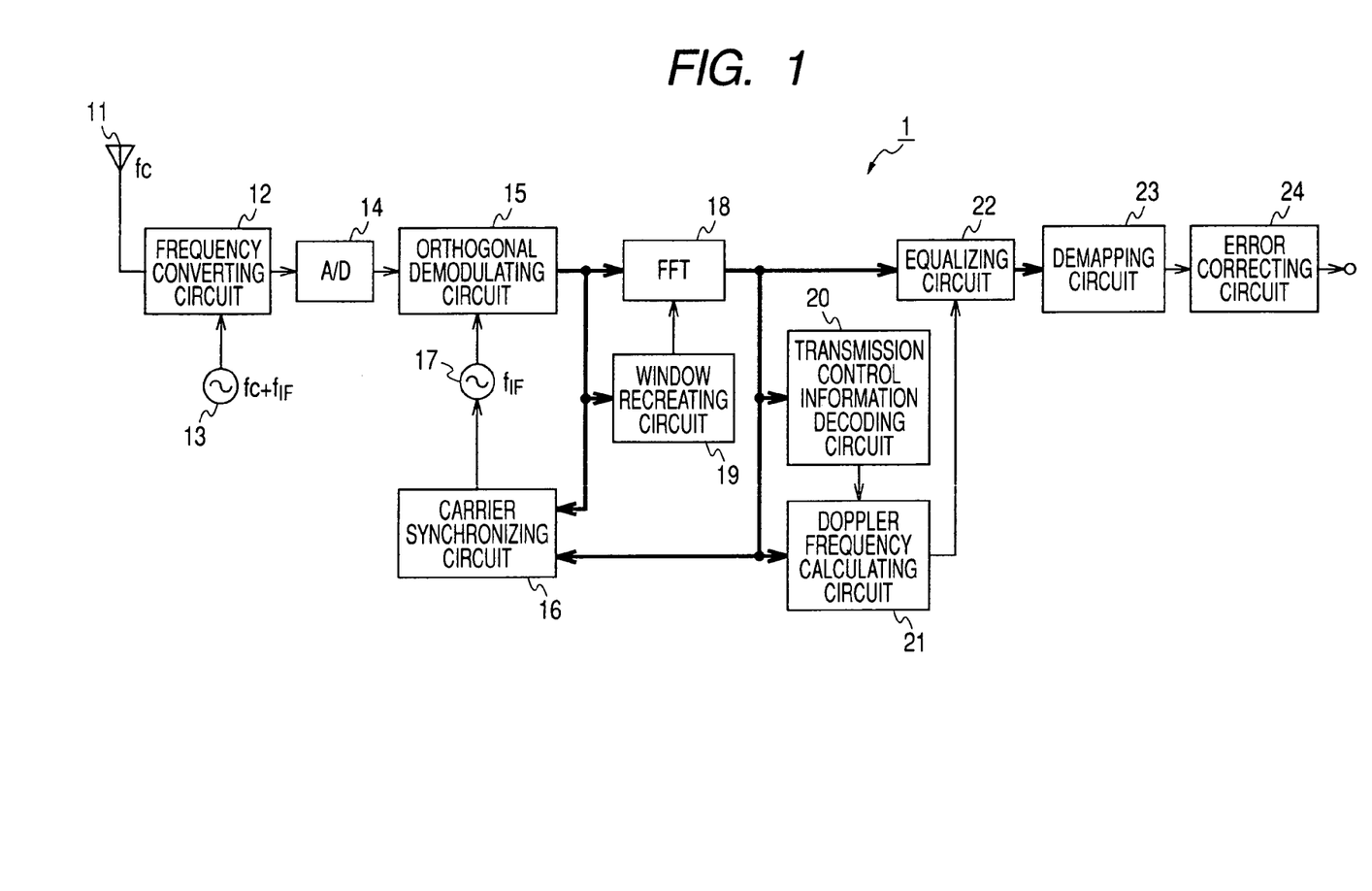
FIG. 1 is a block construction diagram of an OFDM receiving apparatus according to an embodiment of the invention.

FIG. 1 shows a block construction diagram of an OFDM receiving apparatus 1 according to an embodiment of the invention. Here, the thick lines indicate a signal component when the signal transmitted between blocks is a complex signal while the thin lines indicate a signal component when the signal transmitted between blocks is a real signal.

The OFDM receiving apparatus 1 includes, as shown in FIG. 1, an antenna 11, a frequency converting circuit 12, a local oscillator 13, an A/D converting circuit 14, an orthogonal demodulating circuit 15, a carrier synchronizing circuit 16, a local oscillator 17, an FFT calculating circuit 18, a window recreating circuit 19, a transmission control information decoding circuit 20, a Doppler frequency calculating circuit 21, an equalizing circuit 22, a demapping circuit 23 and an error correcting circuit 24.

A broadcasting wave of digital television broadcasting transmitted from a broadcasting station is received by the antenna 11 of the OFDM receiving apparatus 1 and is supplied to the frequency converting circuit 12 as an RF signal at a carrier frequency fc.

In the frequency converting circuit 12, the RF signal received by the antenna 11 is multiplied by the carrier signal at a carrier frequency fc+fIF generated by the local oscillator 13, is thus frequency-converted to the IF signal at a middle frequency fIF and is supplied to the A/D converting circuit 14. The IF signal is digitized by the A/D converting circuit 14 and is supplied to the orthogonal demodulating circuit 15.

The orthogonal demodulating circuit 15 orthogonally demodulates the digitized IF signal by using the carrier signal at the middle frequency fIF, which is controlled by the carrier synchronizing circuit 16 and generated by the local oscillator 17, and outputs an OFDM signal in the base band. The OFDM signal in the base band, which is output from the orthogonal demodulating circuit 15, is a so-called signal in the time domain before FFT calculation is performed thereon. Therefore, the base band signal after orthogonal demodulation and before FFT calculation is called OFDM time-domain signal hereinafter. As a result of the orthogonal demodulation, the OFDM time-domain signal becomes a complex signal including a real-axis component (I-channel signal) and an imaginary-axis component (Q-channel signal). The OFDM time-domain signal output by the orthogonal demodulating circuit 15 is supplied to the FFT calculating circuit 18 and the window recreating circuit 19.

The FFT calculating circuit 18 performs FFT calculation on the OFDM time-domain signal and extracts and outputs the orthogonally-modulated data to each sub-carrier. The signal output from the FFT calculating circuit 18 is a so-called signal in the frequency domain after FFT calculation is performed thereon. Therefore, the signal after FFT calculation is called OFDM frequency domain signal hereinafter.

The FFT calculating circuit 18 extracts a signal in the range of valid symbol length (such as 2048 samples) from one OFDM symbol, that is, removes the range for a guard interval from one OFDM symbol and performs FFT calculation on the extracted OFDM time-domain signal of the 2048 samples. More specifically, the calculation is started at some point in the range from the boundary of the OFDM symbol to the end of the guard interval. The calculation range is called FFT window.

The OFDM frequency domain signal output from the FFT calculating circuit 18 in this way is a complex signal each including a real-axis component (I-channel signal) and an imaginary-axis component (Q-channel signal) like the OFDM time-domain signal. The complex signal may be a signal having an amplitude orthogonally modulated by 16 QAM scheme or 64 QAM scheme, for example. The OFDM frequency-domain signal is supplied to the carrier synchronizing circuit 16, transmission control information decoding circuit 20, Doppler frequency calculating circuit 21 and equalizing circuit 22.

The window recreating circuit 19 delays the input OFDM time-domain signal by a valid symbol period, obtains the correlation between the guard interval part and the signal from which the guard interval is copied, calculates the boundary position of the OFDM symbol based on the part having a higher correlation, and generates a window synchronizing signal indicating the boundary position. The window recreating circuit 19 supplies the generated window synchronizing signal to the FFT calculating circuit 18.

The transmission control information decoding circuit 20 extracts a TMCC (Transmission and Multiplexing Configuration Control) signal, which is used as a reference carrier signal, from a predetermined sub-carrier of the OFDM frequency-domain signal.

The TMCC signal each containing 204 bits of information includes, from the beginning, one bit of DBPSK (Differential Binary Phase Shift Keying) initial phase, 16 bits of synchronizing signal, 3 bits of segment identifier, 102 bits of TMCC information and 82 bits of parity bits as shown in Table 1 below.

TABLE 1

| | |
|---|---|
| B0 | DBPSK Initial Phase |
| B1-B16 | Synchronizing Signal |
| B17-B19 | Segment Identifier |
| B20-B121 | TMCC Information |
| B122-B203 | Parity Bits |

The DBPSK initial phase is a signal functioning as a reference phase in the differential modulation scheme. The synchronizing signal is information indicating the beginning of 204 bits of information unit. More specifically, W0="0011010111101110" and the inverted word, W1="1100101000010001", are alternately inserted in frames. The segment identifier is information indicating whether given transmit data is differentially-modulated or synchronously modulated. The TMCC information is transmission control information including the carrier modulation scheme, time-direction interleave pattern and an encoding rate of convolution code of a received signal. The parity bits are error correction code for 102 bits of TMCC information and adopt abbreviated code (184,102) of difference set cyclic code (273,191).

The transmission control information decoding circuit 20 detects a synchronizing signal included in a TMCC signal, brings the TMCC signal into synch with the OFDM frame, and performs error-correction decoding on the TMCC information included in the synchronized TMCC signal by the difference set cyclic code. The transmission control information decoding circuit 20 supplies the decoded TMCC information to the Doppler frequency calculating circuit 21. Notably, the transmission control information decoding circuit 20 estimates TMCC information from information received in the past if the error-correction decoding may not be performed.

The Doppler frequency calculating circuit 21 calculates a maximum Doppler frequency, as described later, from the received signal point of the sub-carrier containing the TMCC signal and the TMCC information and controls the output of an interpolation validity signal based on the maximum Doppler frequency.

The equalizing circuit 22 performs phase equalization and amplitude equalization on the OFDM frequency-domain signal by using an SP signal. In this case, the equalizing circuit 22 switches the necessity of time-direction interpolation processing as described later based on the interpolation validity signal output from the Doppler frequency calculating circuit 21. The OFDM frequency-domain signal equalized in phase and amplitude is supplied to the demapping circuit 23.

The demapping circuit 23 decodes the OFDM frequency-domain signal equalized in amplitude and phase by the equalizing circuit 22 into data by performing demapping thereon under 16 QAM scheme. The data decoded by the demapping circuit 23 is supplied to the error correcting circuit 24.

The error correcting circuit 24 performs error correction on the supplied data by using Viterbi decoding or Reed-Solomon code, for example. The error-corrected data may be supplied to a subsequent MPEG decoding circuit, for example.

Figure 2:
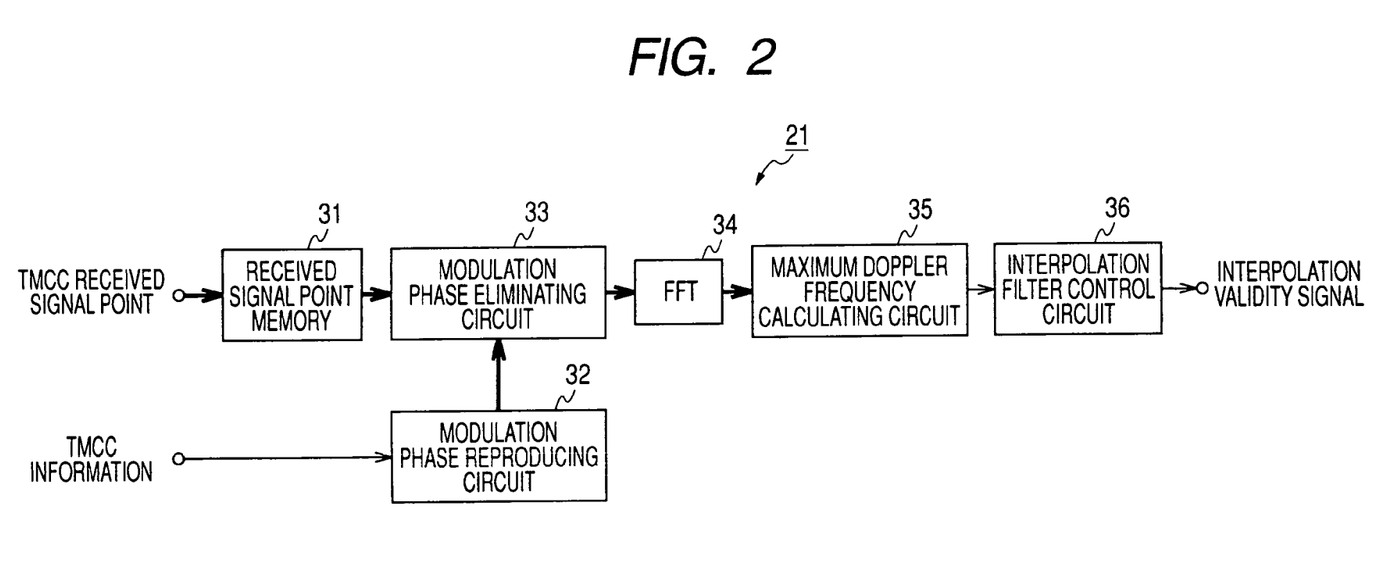
FIG. 2 is a block construction diagram of a Doppler frequency calculating circuit within the OFDM receiving apparatus.

Next, the Doppler frequency calculating circuit 21 will be described in more detail. FIG. 2 shows a block construction diagram of the Doppler frequency calculating circuit 21.

The Doppler frequency calculating circuit 21 includes, as shown in FIG. 2, a received signal point memory 31, a modulation phase reproducing circuit 32, a modulation phase eliminating circuit 33, an FFT calculating circuit 34, a maximum Doppler frequency calculating circuit 35, and an interpolation filter control circuit 36.

Figure 3:
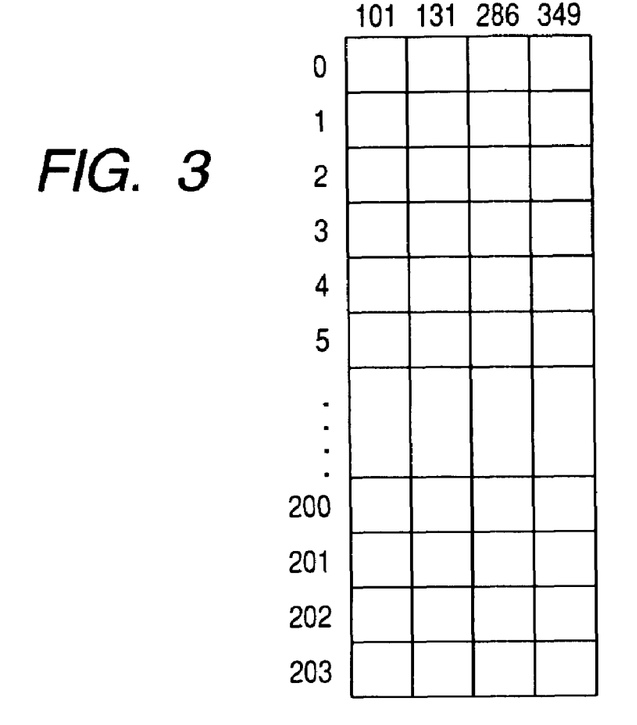
FIG. 3 is a diagram showing a memory space of a received-signal-point memory within the Doppler frequency calculating circuit.

The received signal point memory 31 stores received signal points of a sub-carrier containing a TMCC signal for one OFDM frame. FIG. 3 shows a memory space of the received signal point memory 31. Four sub-carriers containing a TMCC signal exist in one OFDM frame in Mode 3 under ISDB-TSB standard and in synchronous modulation method. The memory space is 204 rows×4 columns since one OFDM frame includes 204 OFDM symbols. Each address of the memory space stores a complex signal point.

The modulation phase reproducing circuit 32 reproduces a transmitted signal point of a sub-carrier containing a TMCC signal based on TMCC information. The modulation phase reproducing circuit 32 supplies the transmitted signal point to the modulation phase eliminating circuit 33.

The modulation phase eliminating circuit 33 eliminates the modulated component of the received signal point read from the received signal point memory 31 based on the transmitted signal point of the sub-carrier, which is supplied from the modulation phase reproducing circuit 32, and supplies the received signal point from which the modulated component is eliminated to the FFT calculating circuit 34.

The FFT calculating circuit 34 performs FFT calculation on the received signal point of each sub-carrier, which is supplied from the modulation phase eliminating circuit 33, and supplies the FFT-calculated data to the maximum Doppler frequency calculating circuit 35.

Figure 4:
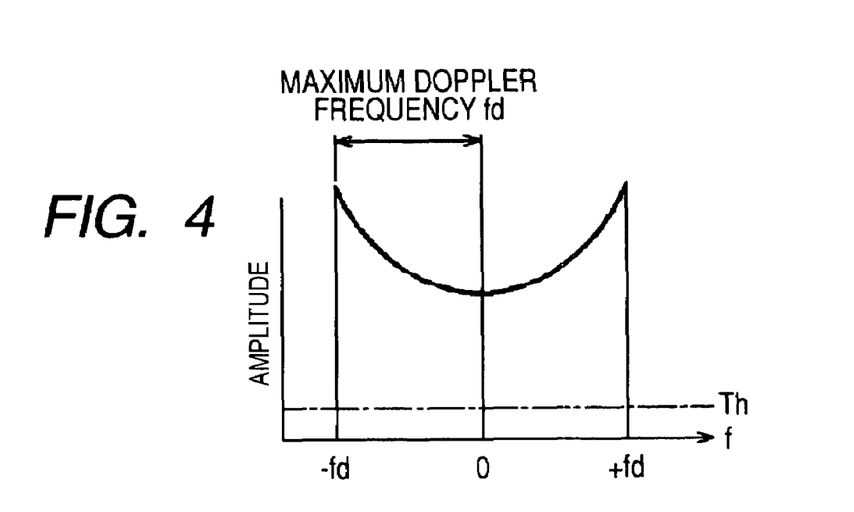
FIG. 4 is a diagram showing a maximum Doppler frequency calculated by a maximum Doppler frequency calculating circuit within the Doppler frequency calculating circuit.

The maximum Doppler frequency calculating circuit 35 obtains the amplitude by converting the FFT-calculated data of each sub-carrier to a real signal and, as shown in FIG. 4, calculates the maximum Doppler frequency fd above an externally defined threshold amplitude Th. If the amplitude in all of the frequency bands is below the threshold amplitude, the maximum Doppler frequency fd is zero (0). The comparison with the threshold amplitude is for eliminating the effect of noise. The maximum Doppler frequency calculating circuit 35 supplies the maximum value of the maximum Doppler frequency fd calculated for each sub carrier to the interpolation filter control circuit 36 as a maximum Doppler frequency fdmax. If the maximum Doppler frequencies fd of all sub-carriers are zero (0), the maximum Doppler frequency calculating circuit 35 supplies the previously calculated maximum Doppler frequency fdmax to the interpolation filter control circuit 36.

The maximum Doppler frequency calculating circuit 35 may supply the mean value of the maximum Doppler frequencies fd above the threshold amplitude to the interpolation filter control circuit 36 as the maximum Doppler frequency fdmax.

The interpolation filter control circuit 36 compares the maximum Doppler frequency fdmax and an externally defined threshold frequency and controls the output of an interpolation validity signal based on the comparison result. The interpolation validity signal is a flag indicating "H" (HIGH) meaning that no interpolation is required if the maximum Doppler frequency fdmax is higher than the threshold frequency while indicating "L" (LOW) meaning that interpolation is required if the maximum Doppler frequency fdmax is equal to or lower than the threshold frequency. The interpolation validity signal is supplied to the equalizing circuit 22.

In this way, the Doppler frequency calculating circuit 21 can calculate a maximum Doppler frequency from the received signal point of a sub-carrier containing a TMCC signal and the TMCC information without using speed information from a speedometer.

Having described that FFT calculation is performed on a received signal point after the modulated component is removed therefrom, the other orthogonal conversion calculation may be performed thereon, and filtering with multiple band pass filters may be performed thereon. In other words, the frequency analysis may be only required on the received signal point from which the modulated component is eliminated. In particular, when the control of the output of an interpolation validity signal is only required as described above, the determination may be only required on whether the amplitude in a higher frequency band than a threshold frequency is higher than a threshold amplitude or not without the necessity of calculating an accurate maximum Doppler frequency for each sub-carrier.

Figure 5:
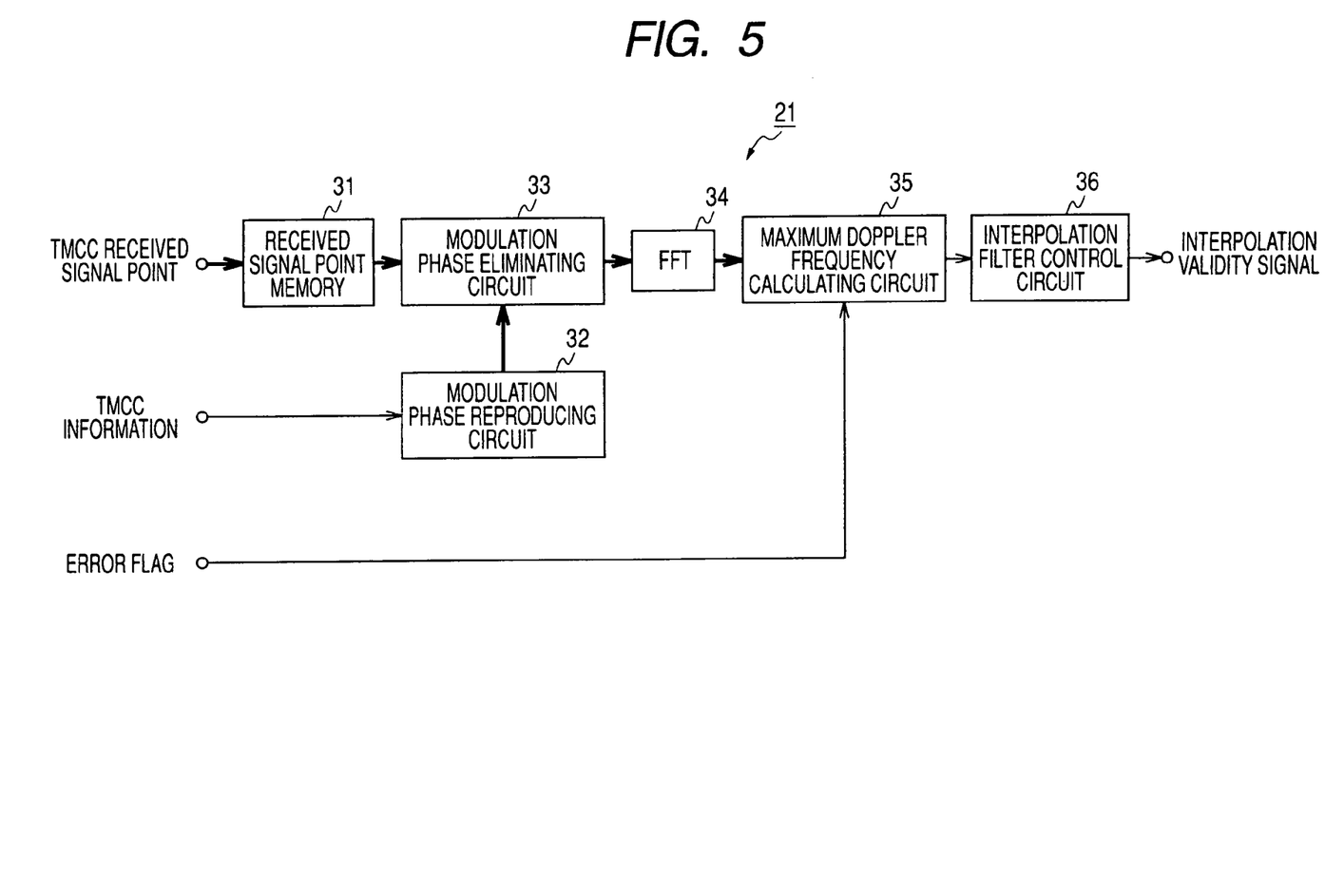
FIG. 5 is a block construction diagram of a Doppler frequency calculating circuit according to a first variation example.

A first variation example of the Doppler frequency calculating circuit 21 will be described here. FIG. 5 shows a block construction diagram of the Doppler frequency calculating circuit 21 according to the first variation example.

The maximum Doppler frequency calculating circuit 35 receives the supply of an error flag indicating the success/failure of error correction on TMCC information. The error flag indicates "L" (LOW) if the error correction succeeds while "H" (HIGH) if the error correction fails. When the error flag indicates "H" (HIGH), that is, when error correction on TMCC information fails, the maximum Doppler frequency calculating circuit 35 raises the threshold amplitude for calculating a maximum Doppler frequency and adopts information with higher reliability.

Figure 6:
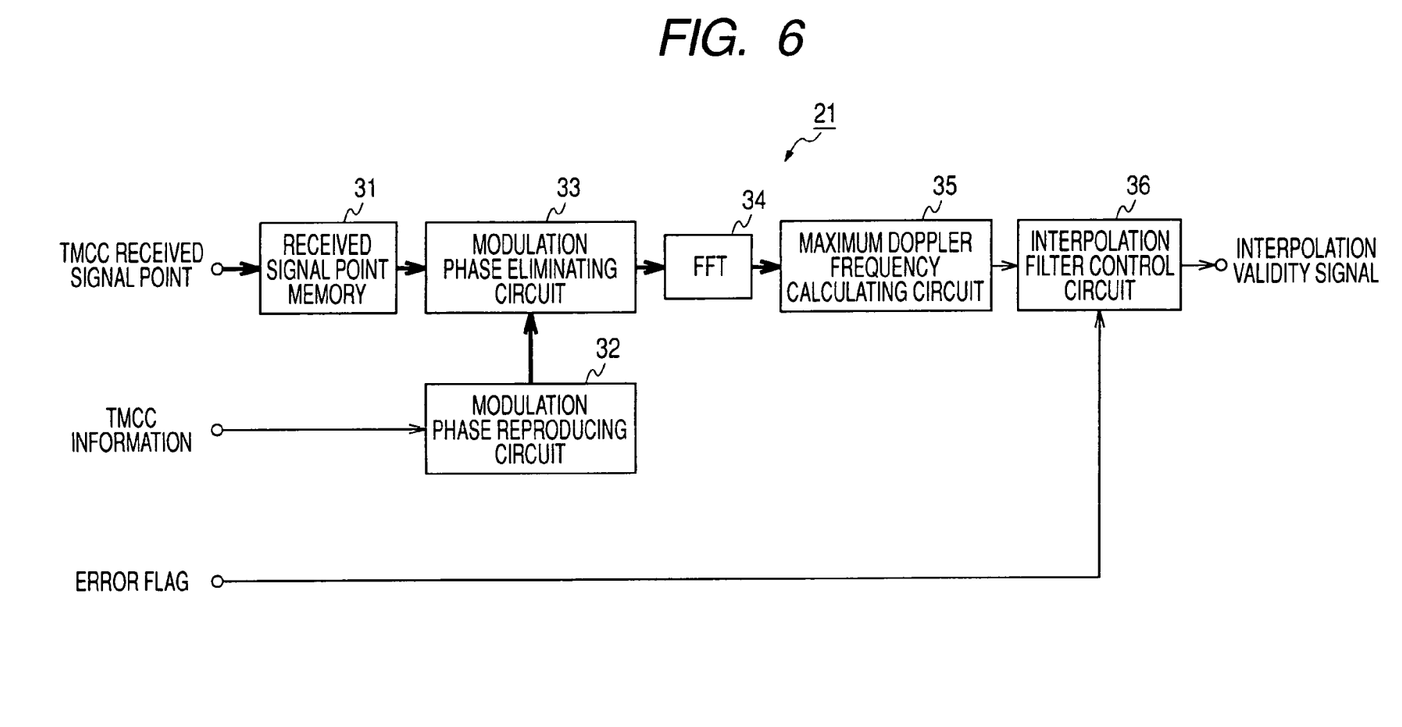
FIG. 6 is a block construction diagram of a Doppler frequency calculating circuit according to a second variation example.

Next, a second variation example of the Doppler frequency calculating circuit 21 will be described. FIG. 6 shows a block construction diagram of the Doppler frequency calculating circuit 21 according to the second variation example.

The interpolation filter control circuit 36 receives the supply of the error flag indicating the success/failure of the error correction on TMCC information. The error flag is identical to that of the first variation example. When the error flag indicates "H" (HIGH), that is, when error correction on TMCC information fails, the interpolation filter control circuit 36 holds the state of the flag of the interpolation validity signal.

Figure 7:
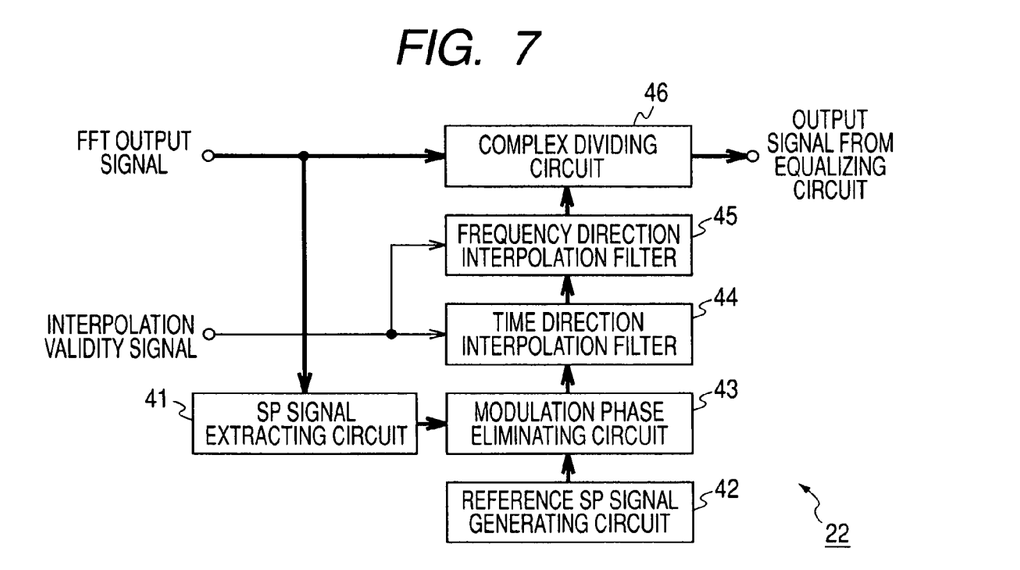
FIG. 7 is a block construction diagram of an equalizing circuit within the OFDM receiving apparatus.

Next, the equalizing circuit 22 will be described in more detail. FIG. 7 shows a block construction diagram of the equalizing circuit 22.

The equalizing circuit 22 includes, as shown in FIG. 7, an SP signal extracting circuit 41, a reference SP signal generating circuit 42, a modulation phase eliminating circuit 43, a time direction interpolation filter 44, a frequency direction interpolation filter 45 and a complex dividing circuit 46.

The SP signal extracting circuit 41 eliminates the information component from an OFDM frequency domain signal and extracts an SP signal only therefrom.

The modulation phase eliminating circuit 43 eliminates the modulated component of the extracted SP signal by using a reference SP signal generated by the reference SP signal generating circuit 42. The SP signal from which the modulated component is eliminated exhibits the transmission path characteristic of the sub-carrier to which an SP signal is inserted.

The time direction interpolation filter 44 identifies an interpolation validity signal and switches the necessity of time direction interpolation processing based on the identification result.

Figure 8:
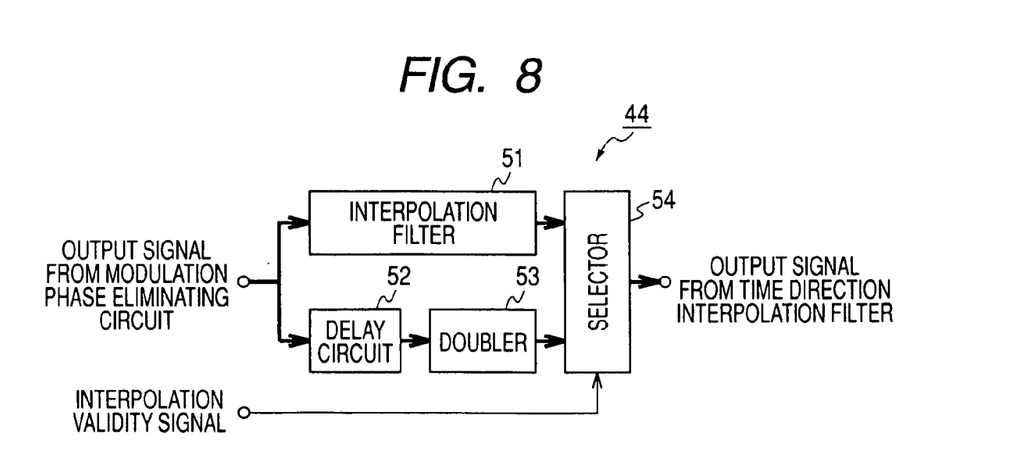
FIG. 8 is a block construction diagram of a time-direction interpolation filter within the equalizing circuit.

FIG. 8 shows a block construction diagram of the time direction interpolation filter 44.

The time direction interpolation filter 44 includes, as shown in FIG. 8, an interpolation filter 51, a delay circuit 52, a doubler 53 and a selector 54.

The interpolation filter 51 inputs the SP signal from which the modulated component is eliminated to a time direction interpolation filter, performs time direction interpolation processing thereon and estimates the transmission path characteristic of the sub-carrier including the SP signal of each OFDM symbol. As a result, the transmission path characteristic of every three sub-carriers in the frequency direction is estimated for all OFDM symbols.

The delay circuit 52 delays the SP signal by a delay time in the interpolation filter 51. The gain of the doubler 53 is identical to the direct-current gain of the interpolation filter 51.

The selector 54 is controlled by the interpolation validity signal. When the interpolation validity signal indicates "L" (LOW), that is, when interpolation is required, the selector 54 selects an output from the interpolation filter 51 and outputs the selected one to the frequency direction interpolation filter 45. On the other hand, when the interpolation validity signal indicates "H" (HIGH), that is, when interpolation is not required, the selector 54 selects an output from the doubler 53 and outputs the selected one to the frequency direction interpolation filter 45.

Figure 9:
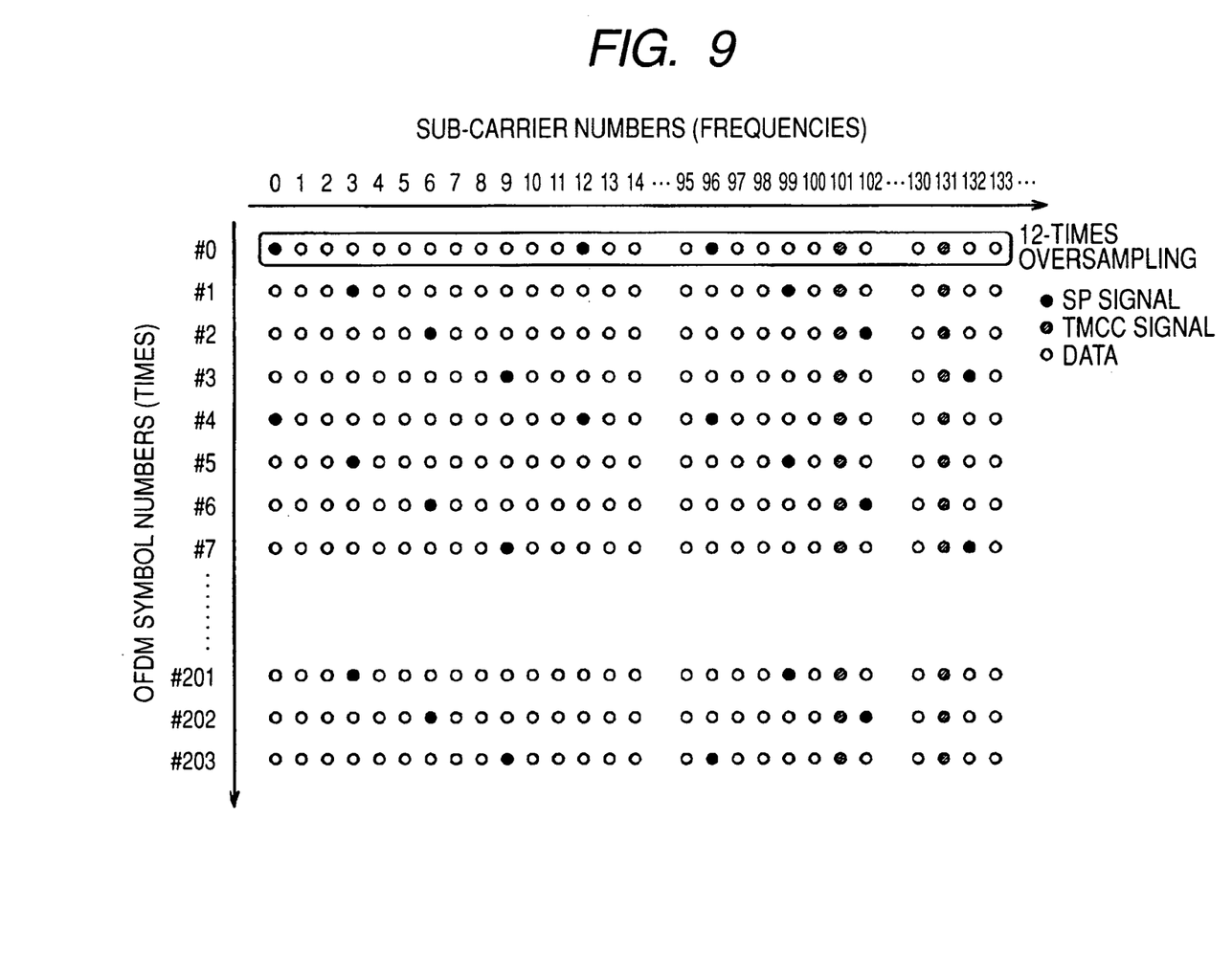
FIG. 9 is a diagram for describing interpolation filter processing in a frequency direction in order to estimate a transmission path characteristic without performing time-direction interpolation.

The frequency direction interpolation filter 45 is controlled by the interpolation validity signal. When the interpolation validity signal indicates "L" (LOW), that is, when interpolation is required, the frequency direction interpolation filter 45 performs frequency direction interpolation processing by performing three-times oversampling on the SP signal interpolated in the time direction and estimates the transmission path characteristic of all sub-carriers within an OFDM symbol. On the other hand, when the interpolation validity signal indicates "H" (HIGH), that is, when interpolation is not required, the frequency direction interpolation filter 45 performs frequency direction interpolation processing by performing 12-times oversampling on the SP signal, which is not interpolated in the time direction, as shown in FIG. 9, and estimates the transmission path characteristic of all sub-carriers within an OFDM symbol.

The complex dividing circuit 46 performs phase equalization and amplitude equalization on an OFDM frequency domain signal by dividing the OFDM frequency domain signal by the estimated transmission path characteristic.

In this way, the equalizing circuit 22 switches the operation not to perform the time-direction interpolation processing when the interpolation validity signal indicates "H" (HIGH), that is, when the maximum Doppler frequency fdmax is higher than the threshold frequency. Thus, the transmission path characteristic can be estimated properly even when the Doppler frequency is high and the Nyquist condition is not satisfied.

Having described the embodiments of the invention, the invention is not limited to the embodiments above, but various changes and modifications may apparently occur without departing from the scope of the invention.

For example, though a received signal point of a sub-carrier including a TMCC signal is applied for calculating a maximum Doppler frequency in the embodiment, an AC (Auxiliary Channel) signal, a CP (Continual Pilot) signal or a TPS (Transmission Parameter Signaling) signal in DVB-T standard may be applied without limiting to the TMCC signal. In other words, the signal may be only required to be transmitted to all OFDM symbols in an OFDM frame and may not require equalization processing.

Furthermore, having described the necessity of the time direction interpolation processing in the equalizing circuit is switched based on a maximum Doppler frequency in the embodiment, the response speed of AGC (Auto Gain Control) may be changed based on the maximum Doppler frequency without limiting to the equalization processing. For example, when the maximum Doppler frequency is high, that is, the speed of motion upon reception of signals in motion is high, the response speed of AGC is preferably raised.

The invention claimed is:

1. A Doppler frequency calculating apparatus that calculates a Doppler frequency, which is a magnitude of a time-dependent fluctuation of a characteristic of a transmission path through which an orthogonal frequency-division multiplexing (OFDM) signal is transmitted, the apparatus comprising:
   received signal point memory means for storing a received signal point of a sub-carrier having a reference carrier signal of the OFDM signal;
   modulated component eliminating means for eliminating a modulated component from the received signal point stored in the received signal point memory means;
   fast Fourier transform calculating means for receiving the signal point from the modulated component eliminating means from which the modulated component has been eliminated and for performing a fast Fourier transform thereon for each sub-carrier; and
   Doppler frequency calculating means for receiving an output from the fast Fourier transform calculating means and for calculating therefrom a maximum Doppler frequency above a predefined amplitude threshold.

2. The Doppler frequency calculating apparatus according to claim 1, wherein the reference carrier signal is one of transmission control information, an AC (Auxiliary Channel) signal and a CP (Continual Pilot) signal.

3. A Doppler frequency calculating apparatus that calculates a Doppler frequency, which is a magnitude of a time-dependent fluctuation of a characteristic of a transmission path through which an orthogonal frequency-division multiplexing (OFDM) signal is transmitted, the apparatus comprising:
   received signal point memory means for storing a received signal point of a sub-carrier having a reference carrier signal of the OFDM signal;
   modulated component eliminating means for eliminating a modulated component from the received signal point stored in the received signal point memory means; and
   Doppler frequency calculating means for calculating a Doppler frequency by performing frequency analysis on the received signal point of each sub-carrier from which the modulated component has been eliminated by the modulated component eliminating means,
   wherein the Doppler frequency calculating means performs a Fourier transform for each sub-carrier, the received signal point from which the modulated component has been eliminated by the modulated component eliminating means and calculates a maximum frequency above a threshold amplitude as the Doppler frequency, and further comprising
   error correction decoding means for performing error correction decoding on transmission control information,
   wherein the Doppler frequency calculating means defines the threshold amplitude when the error correction decoding fails as larger than the threshold amplitude when the error correction decoding succeeds.

4. A Doppler frequency calculating method that calculates a Doppler frequency, which is a magnitude of a time-dependent fluctuation of a characteristic of a transmission path through which an orthogonal frequency-division multiplexing (OFDM) signal is transmitted, the method comprising:
   storing a received signal point of a sub-carrier having a reference carrier signal of the OFDM signal;
   eliminating a modulated component from the received and stored signal point;
   performing a fast Fourier transform on the signal point from which the modulated component has been eliminated for each sub-carrier by using a fast Fourier transform circuit; and
   receiving an output from the fast Fourier transform circuit and calculating therefrom a maximum Doppler frequency above a predefined amplitude threshold.

5. An OFDM demodulating apparatus that demodulates an orthogonal frequency-division multiplexing (OFDM) signal having a pilot signal discretely in a predetermined sub-carrier within a transmission symbol where the transmission symbol results from the division and orthogonal modulation of information for multiple sub-carriers within a predetermined band and is handled as a transmission unit, and the pilot signal has a specific amount of power and a specific phase, the apparatus comprising:
   Fourier converting means for performing a Fourier conversion on the OFDM signal in transmission symbols;
   pilot signal extracting means for extracting the pilot signal for each transmission symbol from a signal converted by the Fourier-converting means;
   wave-equalizing means for estimating a characteristic of a transmission path of all sub-carriers within a transmission symbol by interpolating the pilot signal extracted by the pilot signal extracting means using a time direction interpolation filter and a frequency direction interpolation filter and wave-equalizing a signal having undergone Fourier-conversion by the Fourier converting means based on the estimated characteristic of the transmission path of the sub-carriers; and
   Doppler frequency calculating means for storing, in a received signal point memory, the received signal point of the sub-carrier having the pilot signal of the OFDM signal, for eliminating a modulated component from the received signal point stored in the received signal point memory, and for calculating a Doppler frequency, which is a magnitude of a time-dependent fluctuation of a characteristic of the transmission path, by performing frequency analysis on the received signal point of each sub-carrier from which the modulated component has been eliminated,
   wherein the wave-equalizing means calculates the characteristics of the transmission paths of all of the sub-carriers within the transmission symbol by performing interpolation using the frequency direction interpolation filter only when the Doppler frequency calculated by the Doppler frequency calculating means is larger than a threshold frequency.

6. A Doppler frequency calculating apparatus that calculates a Doppler frequency, which is a magnitude of a time-dependent fluctuation of a characteristic of a transmission path through which an orthogonal frequency-division multiplexing (OFDM) signal is transmitted, the apparatus comprising:
   a received signal point memory operable to store a received signal point of a sub-carrier having a reference carrier signal of the OFDM signal;
   a modulated component eliminating section operable to eliminate a modulated component from the received signal point stored in the received signal point memory;

a fast Fourier transform calculating circuit to receive the signal point from the modulated component eliminating section from which the modulated component has been eliminated and to perform a fast Fourier transform thereon for each sub-carrier; and a Doppler frequency calculating section operable to receive an output from the fast Fourier transform calculating circuit and calculate therefrom a maximum Doppler frequency above a predefined amplitude threshold.

7. An OFDM demodulating apparatus that demodulates an orthogonal frequency-division multiplexing (OFDM) signal having a pilot signal discretely in a predetermined sub-carrier within a transmission symbol where the transmission symbol results from the division and orthogonal modulation of information for multiple sub-carriers within a predetermined band and is handled as a transmission unit, and the pilot signal has a specific amount of power and specific phase, the apparatus comprising:

a Fourier converting section operable to perform a Fourier conversion on the OFDM signal in transmission symbols;

a pilot signal extracting section operable to extract the pilot signal for each transmission symbol from a signal converted by the Fourier-converting section;

an wave-equalizing section operable to estimate a characteristic of a transmission path of all sub-carriers within a transmission symbol by interpolating the pilot signal extracted by the pilot signal extracting section using a time direction interpolation filter and a frequency direction interpolation filter and wave-equalizing a signal having undergone Fourier-conversion by the Fourier converting section based on the estimated characteristic of the transmission path of the sub-carriers; and a Doppler frequency calculating section operable to store, in a received signal point memory section, the received signal point of the sub-carrier having the pilot signal of the OFDM signal, to eliminate a modulated component from the received signal point stored in the received signal point memory section, and to calculate a Doppler frequency, which is a magnitude of a time-dependent fluctuation of a characteristic of the transmission path, by performing frequency analysis on the received signal point of each sub-carrier from which the modulated component has been eliminated, wherein the wave-equalizing section calculates the characteristics of the transmission paths of all of the sub-carriers within the transmission symbol by performing interpolation using the frequency direction interpolation filter only when the Doppler frequency calculated by the Doppler frequency calculating section is larger than a threshold frequency.

* * * * *